United States Patent Office 2,749,345
Patented June 5, 1956

2,749,345
PYRIMIDINE COMPOUNDS

George H. Hitchings, Tuckahoe, and Roland K. Robins, Yonkers, N. Y., assignors to Burroughs Wellcome & Co. (U. S. A.) Inc., Tuckahoe, N. Y., a corporation of New York No Drawing. Application January 2, 1953, Serial No. 329,474

4 Claims. (Cl. 260—256.4)

This application discloses a new group of pyrido (2,3-d) pyrimidines and a method of preparing such compounds. These substances are useful as pharmaceutical intermediates and as inhibitors of microorganisms such as lactic acid bacteria.

The compounds may be represented by the following general formula:

[Structure I]

wherein X is selected from the class consisting of chloro, mercapto, amino and substituted amino groups and R is selected from the group consisting of hydrogen and alkyl radicals.

A suitable intermediate for the preparation of these derivatives is the 4-hydroxypyrido (2,3-d) pyrimidine (Formula I, X=OH). A new method for the preparation of substances of this type is disclosed whereby an α-aminonicotinic acid (II)

[Structure: II + HCONH$_2$ → III → I]

is heated with an excess of formamide at temperatures substantially in excess of 120° for periods of 2 to 5 hours and the desired product is recovered.

The 4-hydroxy derivative is converted to the mercapto derivative by treatment with phosphorus pentasulfide and to the 4-chloro derivative by treatment with phosphoryl chloride. Various reactions of these substances and alternative routes to various derivatives are described as illustrations of the teachings of this invention.

EXAMPLE 1

4-hydroxypyrido (2,3-d) pyrimidine (I)

Fifty grams of α-aminonicotinic acid and 100 g. of formamide were heated at 165°–170° (inside temperature) by means of an oil bath for 2.5 hours. The cooled solid which resulted was recrystallized from 700 ml. of water to give 37.5 g. of colorless plates, M. P. 255°–257°. A second recrystallization from water raised the M. P. to 258°.

The ultraviolet absorption spectra of the crude product showed the absence of α-aminonicotinic acid.

EXAMPLE 2

4-chloropyrido (2,3-d) pyrimidine (II)

To 300 ml. of phosphorus oxychloride was added 20.0 g. of 4-hydroxypyrido (2,3-d) pyrimidine and the solution was refluxed for 1 hours. (There remained a small amount of insoluble tarry material which did not dissolve with longer refluxing.) The excess phosphorus oxychloride was distilled off and the syrupy residue poured onto ice. The 4-chloropyrido (2,3-d) pyrimidine was isolated by extraction of the aqueous solution with chloroform. The yield of crude product was 9.8 g., melting at 135° (dec.). A small amount was recrystallized from heptane (Skellysolve C) raising the M. P. to 137°–138° (dec.).

EXAMPLE 3

4-aminopyrido (2,3-d) pyrimidine

Method A.—To 50 ml. of concentrated ammonium hydroxide was added 5.0 g. of crude 4-chloropyrido (2,3-d) pyrimidine and the solution was heated for 45 minutes on the steam bath. The solution was decolorized with norite and the filtrate was cooled in an ice and salt bath and saturated with ammonia. The cooled solution was then filtered to give 3.0 g. of 4-aminopyrido (2,3-d) pyrimidine as colorless needles.

Recrystallization was effected from a 95% isopropanol-water solution to give colorless needles M. P. 301°–302°.

EXAMPLE 4

4-aminopyrido (2,3-d) pyrimidine 2-mercapto-4-aminopyrido (2,3-d) pyrimidine (see our co-pending application) (300 mg.) was dissolved in 800 ml. of ethanol and 50 ml. of concentrated ammonium hydroxide was added and then 1 g. of Raney nickel and the solution refluxed for 3 hours, filtered and evaporated to dryness on the steam bath. The residue was extracted with 50 ml. of water and evaporation of the aqueous solution yielded 60 mg. of product. The ultraviolet absorption spectra was identical to that of 4-aminopyrido (2,3-d) pyrimidine prepared as described in Example 3.

EXAMPLE 5

4-anilinopyrido (2,3-d) pyrimidine 1.0 g. of 4-chloropyrido (2,3-d) pyrimidine was carefully added to one gram of aniline in 10 ml. of water. The solution was heated for 0.5 hour on the steam bath and then made basic with concentrated ammonium hydroxide and the solution cooled and filtered. The crude precipitate was recrystallized from 95% ethanol. A second recrystallization from the same solvent gave 0.51 g. of light green needles, M. P. 256°–257°.

EXAMPLE 6

4-mercaptopyrido (2,3-d) pyrimidine

Twenty-three grams of 4-hydroxypyrido (2,3-d) pyrimidine, 100 g. of phosphorus pentasulfide and 500 ml. of tetralin were heated to 175°–180° for 1½ hours. The solvent was removed by filtration; the residue was treated with hot water and extracted with an excess of dilute (0.1 N) sodium hydroxide and filtered. The mercapto compound was precipitated by acidification of the filtrate with a slight excess of glacial acetic acid. The crude yellow product was washed by suspension in 1 liter of boiling water and then purified by Soxhlet extraction using absolute ethanol. Yield was 11.2 g.

EXAMPLE 7

4-hydrazinopyrido (2,3-d) pyrimidine

Two grams of 4-chloropyrido (2,3-d) pyrimidine (II) was added carefully with cooling to a solution of 15 ml. of 95% hydrazine hydrate and 15 ml. of water. The solution was then heated for 30 minutes on the steam bath and set aside overnight to crystallize. The crude precipitate was filtered, washed with a little ice water and recrystallized from absolute ethanol to give orange-red needles, M. P. 164°–166° (unc.). Yield was 1.0 g.

EXAMPLE 8

*4-hydroxy-7-methylpyrido (2,3-d) pyrimidine*

2-amino-6-methylnicotinic acid was heated with formamide exactly as described in Example 1. The melt was recrystallized from water yielding 4-hydroxy-7-methylpyrido (2,3-d) pyrimidine.

EXAMPLE 9

*4-chloro-7-methylpyrido (2,3-d) pyrimidine*

The product from Example 8 was treated with phosphoryl chloride as described in Example 2, and the chloro compound was isolated by chloroform extraction and evaporation of the solvent.

EXAMPLE 10

*4-amino-7-methylpyrido (2,3-d) pyrimidine*

The crude product from the experiment described in Example 9 was heated with 50 ml. of concentrated ammonium hydroxide. The amino derivative was recovered by evaporation and was recrystallized from ethanol in colorless needles.

EXAMPLE 11

*4-diethylaminopyrido (2,3-d) pyrimidine*

3.0 g. of 4-chloropyrido (2,3-d) pyrimidine was dissolved in 150 ml. of dry dioxane. Then 30 ml. of diethylamine was added and solution allowed to remain overnight in the refrigerator. The diethylamine hydrochloride was filtered off and the excess dioxane and diethylamine were evaporated on the steam bath. The gummy residue was extracted several times with Skellysolve "B."

Concentration of the combined solutions yielded on cooling 0.7 g. of almost colorless crystals, M. P. 70°–72°. A second recrystallization from the same solvent raised the M. P. to 72°–73°.

We claim:

1. A method of preparing a 4-aminopyrido (2,3-d) pyrimidine as set forth in claim 2 which comprises treating 2-mercapto-4-aminopyrido (2,3-d) pyrimidine with ammonium hydroxide and Raney nickel and refluxing to produce the 4-aminopyrido (2,3-d) pyrimidine.

2. A method of preparing a 4-aminopyrido (2,3-d) pyrimidine which comprises reacting an α-aminonicotinic acid with formamide substantially in excess of the stoichiometric amount at a temperature in excess of 120° to form a 4-hydroxypyrido (2,3-d) pyrimidine, reacting this compound with phosphoryl oxychloride, and heating the resulting derivative with an aminating reagent selected from the class consisting of ammonium hydroxide, aniline, hydrazine hydrate, and diethylamine to produce the 4-aminopyrido (2,3-d) pyrimidine.

3. In the preparation of pyrido (2,3-d) pyrimidines, the step which comprises reacting an α-aminonicotinic acid with formamide substantially in excess of the stoichiometric amount at a temperature in excess of 120°.

4. In the preparation of pyrido (2,3-d) pyrimidines, the steps which comprise reacting an α-aminonicotinic acid with formamide substantially in excess of the stoichiometric amount, and at a temperature in excess of 120° to form a 4-hydroxypyrido (2,3-d) pyrimidine, and reacting this compound with phosphoryl oxychloride.

References Cited in the file of this patent

Lecomte et al.: Bull. Soc. Chim. 12, 91–2 (1945).
Hackh: Chem. Dictionary, 1944 ed., page 608.
Klisiecky et al.: Roczniki Chem. 3, 251–260 (1923).